United States Patent
Kimura et al.

(10) Patent No.: US 6,594,110 B2
(45) Date of Patent: Jul. 15, 2003

(54) REMOVABLE DISK DRIVE

(75) Inventors: Hitoshi Kimura, Gunma (JP); Koji Takeda, Gunma (JP)

(73) Assignee: NEC Corporation, Tokyo (JP)

( * ) Notice: Subject to any disclaimer, the term of this patent is extended or adjusted under 35 U.S.C. 154(b) by 151 days.

(21) Appl. No.: 09/912,597

(22) Filed: Jul. 26, 2001

(65) Prior Publication Data

US 2002/0030927 A1 Mar. 14, 2002

(30) Foreign Application Priority Data

Jul. 26, 2000 (JP) .................................... 2000-226145

(51) Int. Cl.[7] .......................... G11B 19/00; G11B 17/02; G11B 33/14
(52) U.S. Cl. .................. 360/99.08; 369/75.1; 369/77.2; 360/99.06; 360/99.02
(58) Field of Search ............................ 360/99.08, 99.06, 360/99.04, 99.02, 98.07, 99.03, 99.07; 369/75.1, 75.2, 77.1, 77.2

(56) References Cited

U.S. PATENT DOCUMENTS

| | | | | |
|---|---|---|---|---|
| 4,623,952 A | * | 11/1986 | Pexton | 361/220 |
| 5,486,966 A | * | 1/1996 | Ahn | 360/271.6 |

FOREIGN PATENT DOCUMENTS

| | | |
|---|---|---|
| JP | 47-17614 | 3/1946 |
| JP | 58-023061 | 8/1956 |
| JP | U 59-92494 | 6/1984 |
| JP | U 60-132689 | 9/1985 |
| JP | A 61-39264 | 2/1986 |
| JP | A 61-39265 | 2/1986 |
| JP | U 62-135405 | 8/1987 |
| JP | A 1-107366 | 4/1989 |
| JP | A 1-185877 | 7/1989 |
| JP | A 2-35658 | 2/1990 |
| JP | U 2-68359 | 5/1990 |
| JP | U 2-84166 | 6/1990 |
| JP | 04252413 A | * 9/1992 | ............ G11B/5/53 |
| JP | 05144167 A | * 6/1993 | ............ G11B/19/20 |
| JP | 08017091 A | * 1/1996 | ............ G11B/15/00 |
| JP | 08273341 A | * 10/1996 | ............ G11B/33/12 |
| JP | A 10-134545 | 5/1998 |
| JP | 11259801 A | * 9/1999 | ............ G11B/5/02 |
| JP | 2000090555 A | * 3/2000 | ............ G11B/19/20 |

OTHER PUBLICATIONS

"Motor Antistatic Brush and Spindle Seal for a Hard Disk File," Sep. 1, 1985, IBM Technical Disclosure Bulletin, vol. No. 28, Iss. No. 4, pp. 1816–1817.*

"Foil Spindle Ground," Nov. 1, 1993, IBM Technical Disclosure Bulletin, vol No. 36, Iss. No. 11, pp. 83–84.*

Ito, "Earth and Static Electricity," *Nikkan Kogyo Shinbusha*, First edition, 6th printing, 1986, pp. 87–88.

* cited by examiner

*Primary Examiner*—William Klimowicz
(74) *Attorney, Agent, or Firm*—Young & Thompson

(57) ABSTRACT

To provide a removable disk drive which can discharge static electricity with which a recording disk is charged, which does not produce noise and metal powder when a spindle motor shaft is rotated, and the electric power consumption of which is small. A removable disk drive 10 is provided with an electrostatic brush 5 disposed between a spindle motor shaft 1 and a housing 4 and formed of a conductive material. When operation of inserting a recording disk 6 in the removable disk drive 10 is on the way, the electrostatic brush 5 is in contact with the spindle motor shaft 1 and the housing 4 to discharge static electricity with which the recording disk 6 is charged to the housing 4 through the spindle motor shaft 1 and the electrostatic brush 5. After the recording disk 6 is completely inserted in the removable disk drive 10, the electrostatic brush 5 is out of contact with the spindle motor shaft 1 to prevent noise and metal powder from being produced when the spindle motor shaft 1 is rotated.

4 Claims, 5 Drawing Sheets

REMOVABLE DISK DRIVE

BACKGROUND OF THE INVENTION

The present invention relates to a removable disk drive provided with an antistatic component, and more particularly, to a removable disk drive provided with an electrostatic brush which does not produce noise and metal powder when a spindle motor shaft is rotated. It is to be noted that a removable disk as used herein includes disks such as a floppy disk (a flexible disk), a magneto-optical disk, a Digital Versatile Disk-Read Only Memory (DVD-ROM), a DVD-Random Access Memory (DVD-RAM), a DVD-Recordable (DVD-R), a DVD-Re-Writable (DVD-RW), a Compact Disk-Read Only Memory (CD-ROM), a CD-Recordable (CD-R), and a CD-Re-Writable (CD-R/W).

Conventionally, a countermeasure against static electricity is an important problem of a removable disk drive. Under an environment of low humidity, it is often the case that the human body is charged with static electricity. When the person holds a recording disk, the recording disk is charged with static electricity. If the charged recording disk is inserted in a removable disk drive without a countermeasure against static electricity, the static electricity is discharged to an electric circuit in the drive, which may cause malfunction of or damage to the electric circuit.

Referring to FIG. 3, in a recording disk 6, metal portions, i.e., a shutter 7 and a hub 8, are easily charged with static electricity. It is to be noted that the shutter 7 opens and closes a insertion slot for a recording/reproducing head (now shown). The shutter 7 is structured to be closed when the recording disk 6 is not inserted in the removable disk drive and to be open when the recording disk 6 is inserted in the removable disk drive to prevent foreign matters from entering the recording disk 6 while the recording disk 6 is not inserted therein. The hub 8 engages with a spindle motor shaft provided in the removable disk drive when the recording disk 6 is inserted in the removable disk drive to locate the recording disk 6 and to transmit the rotation of the spindle motor shaft to a recording medium (not shown) in the recording disk 6.

FIGS. 4 and 5 are sectional views illustrating the structure and operation of a conventional removable disk drive with a countermeasure against static electricity. FIG. 4 illustrates a state when operation of inserting the recording disk 6 in a removable disk drive 12 is on the way, while FIG. 5 illustrates a state when the insertion of the recording disk 6 in the removable disk drive 12 is completed. As illustrated in FIGS. 4 and 5, in the conventional removable disk drive 12, an electrostatic brush 11 which is always in contact with a housing 4 and a spindle motor shuttle 1 of the removable disk drive 12 is provided. Static electricity with which the recording disk 6 is charged is discharged through the spindle motor shaft 1 and the electrostatic brush 11 to the housing 4.

However, the conventional technology has the following problems. As illustrated in FIGS. 4 and 5, the electrostatic brush 11 is structured to be in contact with the spindle motor shaft 1 not only when the recording disk 6 is not inserted in the removable disk drive 12 and when insertion of the recording disk 6 in the removable disk drive 12 is on the way, but also when the recording disk 6 is completely inserted. Since the spindle motor shaft 1 rotates when data is read from and written to the recording disk 6, this rotation is accompanied by rubbing of the electrostatic brush 11 with the spindle motor shaft 1. Therefore, there is a problem that noise is produced when the spindle motor shaft 1 is rotated.

Further, when the electrostatic brush 11 is used for a long time, wear is caused due to the rotation of the spindle motor shaft 1 to produce metal powder of the electrostatic brush 11 and the spindle motor shaft 1. Therefore, there is a problem that the metal powder attaches to the recording disk 6 to damage the recording disk 6 to cause abrasions thereon, for example, and thus, cause a reading error.

Further, since the electrostatic brush 11 is a load on the rotation of the spindle motor shaft 1, electric power consumption accompanied by the rotation of the spindle motor shaft 1 is increased and the amount of generated heat is increased accordingly.

SUMMARY OF THE INVENTION

The present invention is made in view of the above problems, and an object of the present invention is to provide a removable disk drive which can discharge static electricity with which a recording disk is charged, which does not produce noise and metal powder when a spindle motor shaft is rotated, and the electric power consumption of which is small.

According to the present invention, a removable disk drive having a recording disk inserted therein for reading data from and writing data to the recording disk comprises a housing, a spindle motor shaft provided in the housing for rotating the recording disk, and an electrostatic brush provided between the housing and the spindle motor shaft, the electrostatic brush coming in contact with the housing and the spindle motor shaft and being formed of a conductive material for discharging static electricity of the recording disk to the housing, and is characterized in that the electrostatic brush is in contact with the spindle motor shaft and the housing when operation of inserting the recording disk is on the way and is out of contact with the spindle motor shaft when the spindle motor shaft is rotating after insertion of the recording disk is completed.

According to the present invention, since the electrostatic brush of the removable disk drive is out of contact with the spindle motor shaft when the spindle motor shaft is rotating, the rotation of the spindle motor shaft is not accompanied by rubbing of the electrostatic brush, and thus, noise and metal powder can be prevented from being produced.

Further, the electrostatic brush may be structured to be formed of a resilient material or to have a spring structure and to come in contact with the spindle motor shaft with predetermined pressing force.

This can ensure contact of the electrostatic brush with the spindle motor shaft.

BRIEF DESCRIPTION OF THE DRAWINGS

These and other objects, features These and other objects, features and advantages of the invention will become more apparent from the following detailed description when taken in conjunction with the accompanying drawings, in which.

DESCRIPTION OF THE PREFERRED EMBODIMENT

Figure 1:
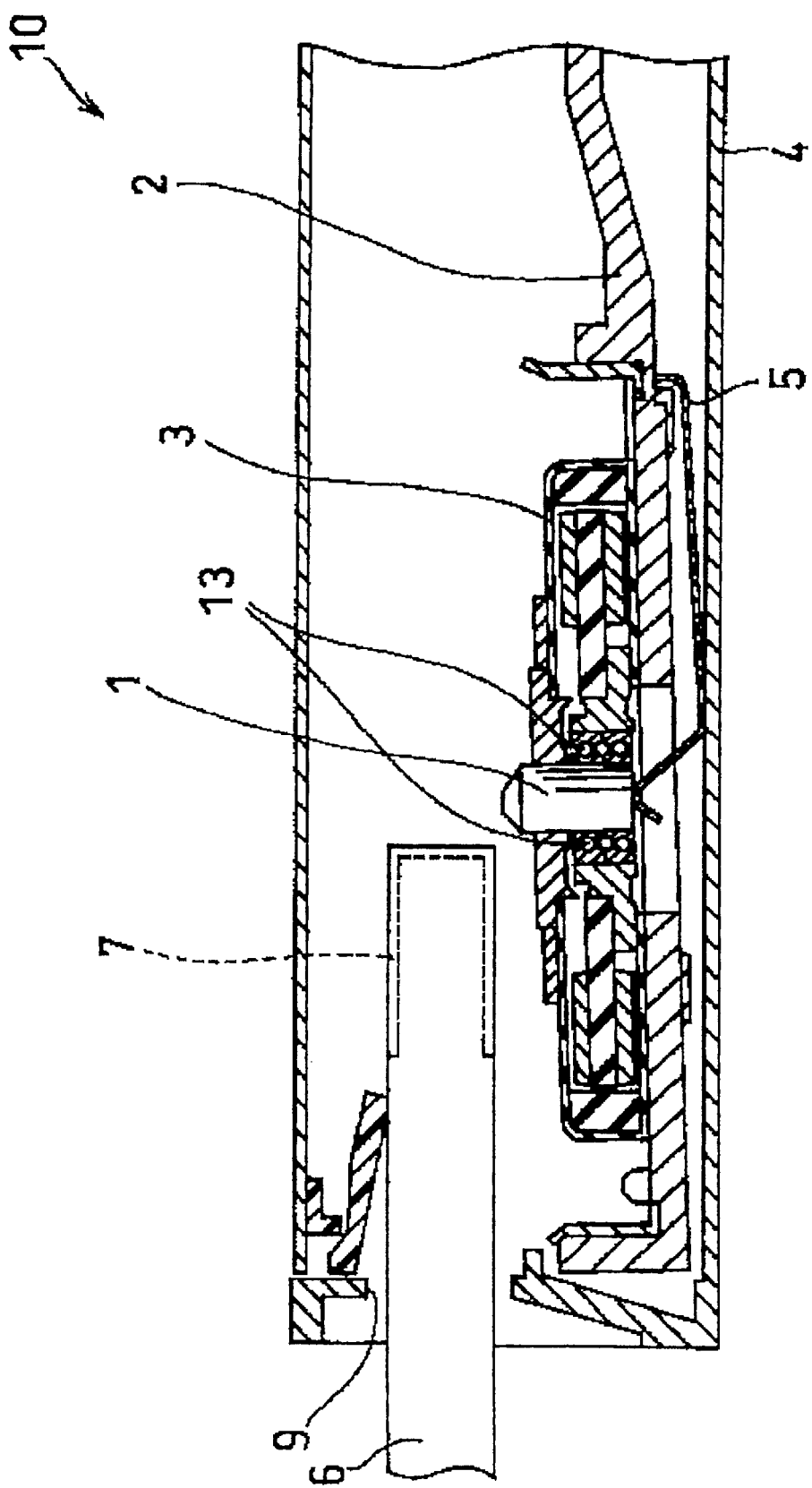
FIG. 1 is a sectional view illustrating the structure and operation of a removable disk drive of the present embodiment, and illustrating a state when operation of inserting a recording disk in the removable disk drive is on the way.
Figure 2:
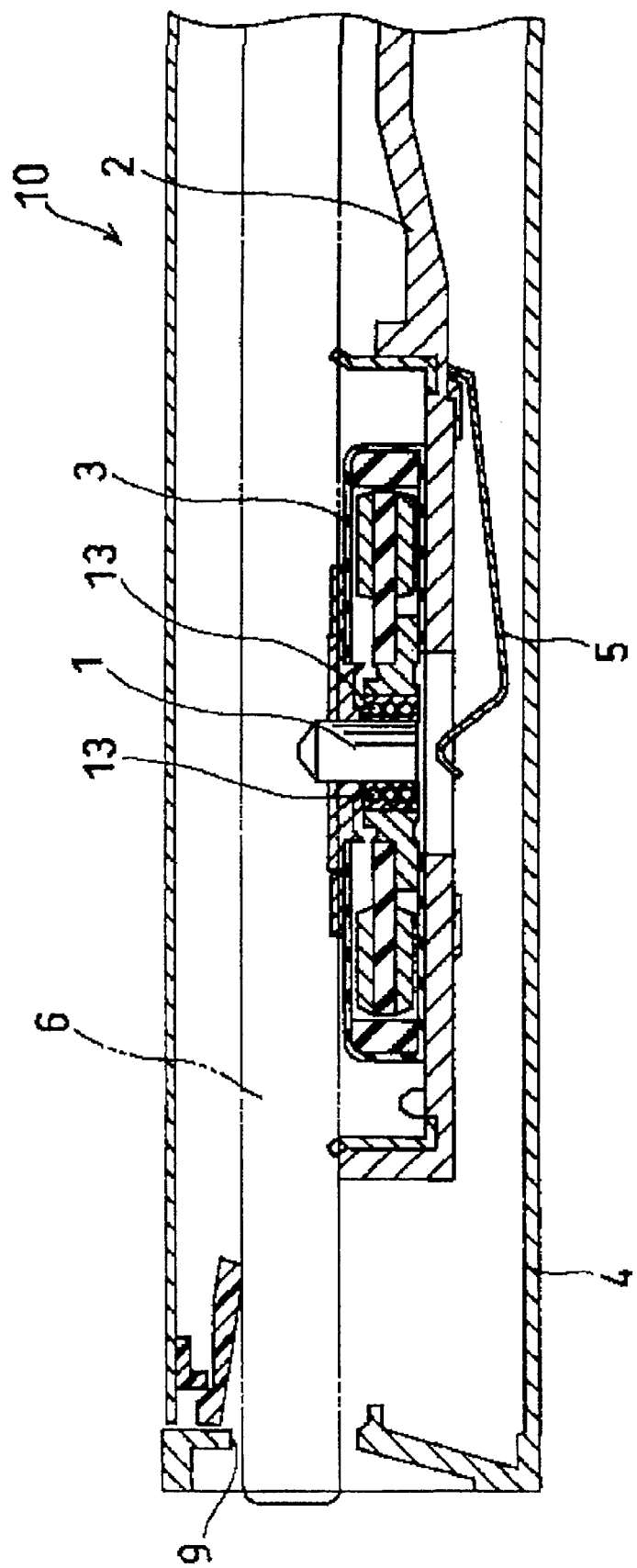
FIG. 2 is a sectional view illustrating the structure and operation of the removable disk drive of the present embodiment, and illustrating a state when the insertion of the recording disk in the removable disk drive is completed.
Figure 3:
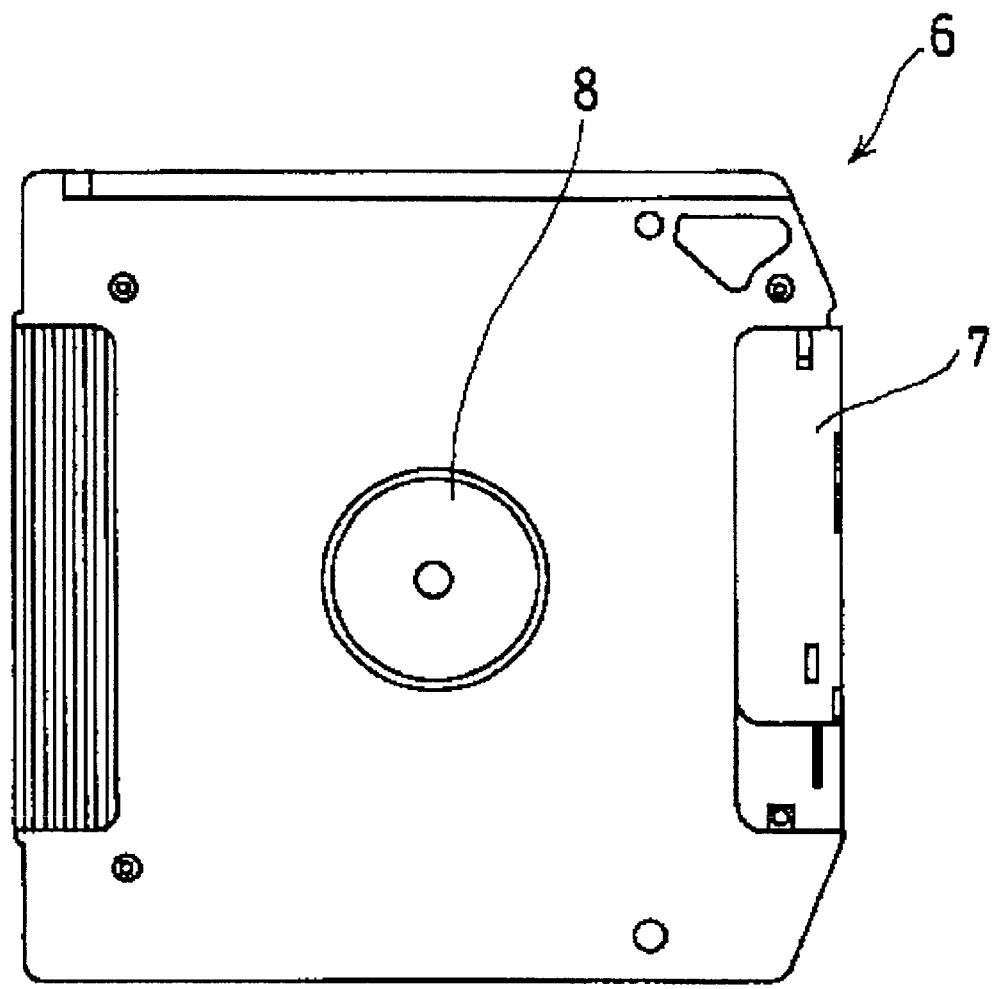
FIG. 3 is a plan view illustrating a general structure of a recording disk.
Figure 4:
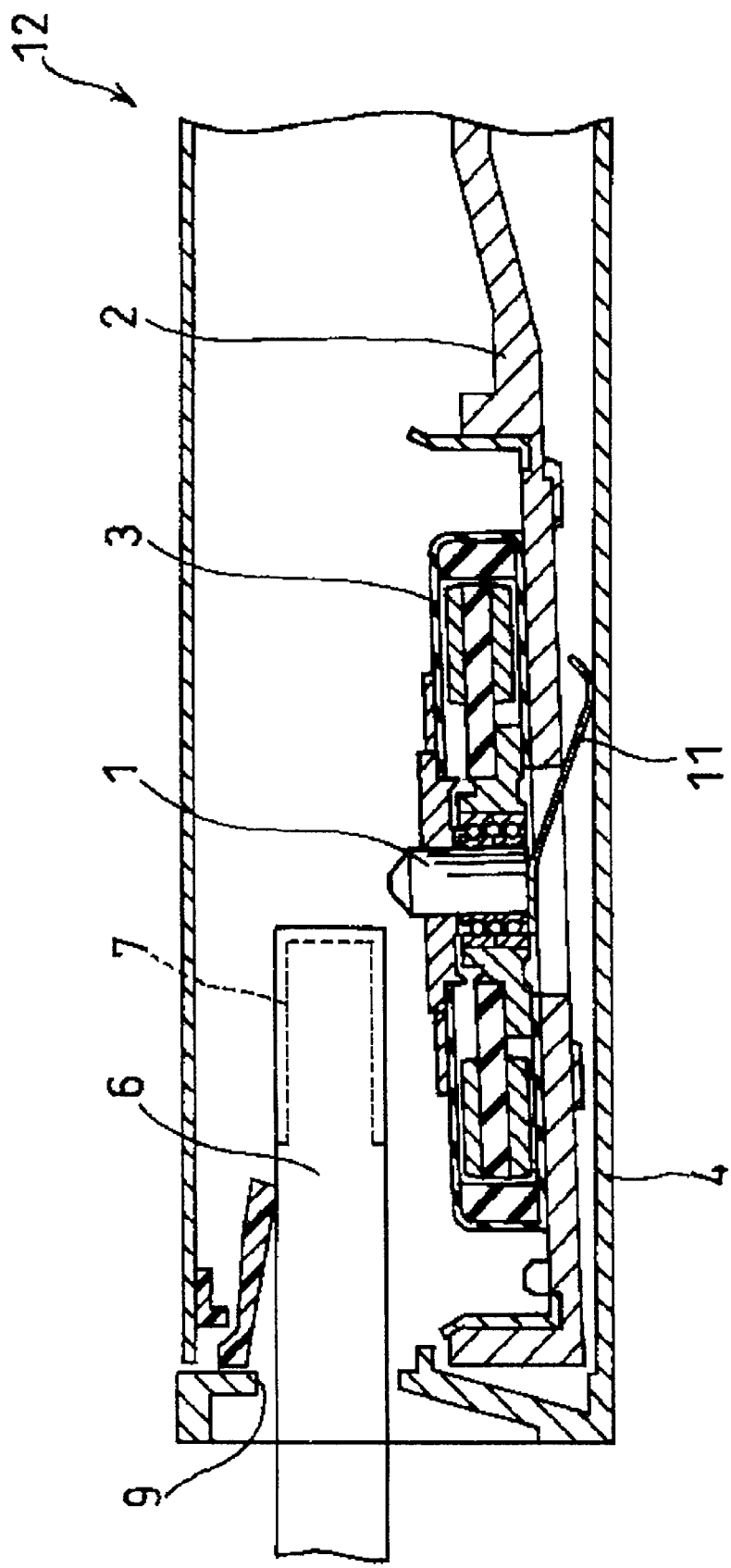
FIG. 4 is a sectional view illustrating the structure and operation of a conventional removable disk drive, and illustrating a state when operation of inserting a recording disk in the removable disk drive is on the way.
Figure 5:
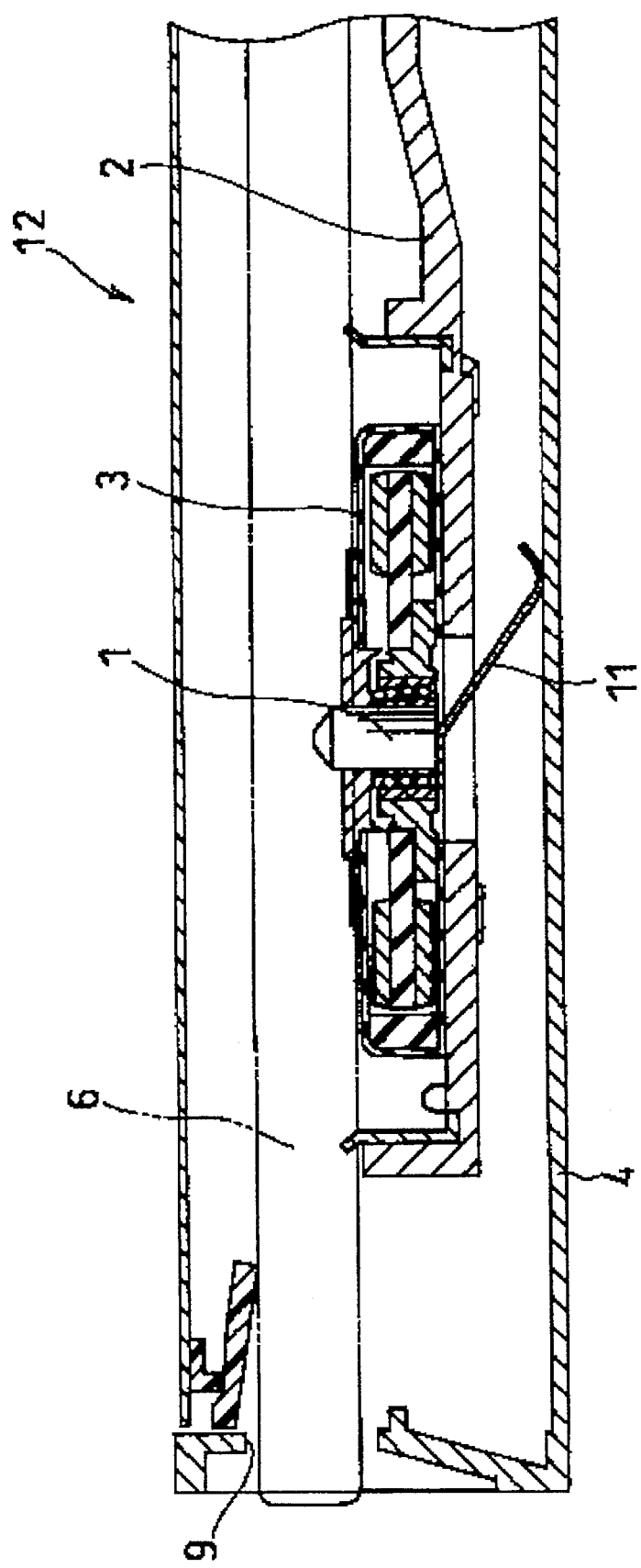
FIG. 5 is a sectional view illustrating the structure and operation of a conventional removable disk drive, and illustrating a state when the insertion of the recording disk in the removable disk drive is completed.

An embodiment of the present invention is specifically described in the following with reference to the attached drawings. FIGS. 1 and 2 are sectional views illustrating the structure and operation of a removable disk drive of the present embodiment. FIG. 1 illustrates a state when operation of inserting the recording disk 6 in a removable disk drive 10 is on the way, while FIG. 2 illustrates a state when the insertion of the recording disk 6 in the removable disk drive 10 is completed. FIG. 3 is a plan view illustrating a general structure of a recording disk.

First, the structure of the removable disk drive of the present embodiment is described. It is to be noted that a recording disk 6 inserted in the removable disk drive 10 is the same as the recording disk described in the section of "Prior Art" and illustrated in FIG. 3.

In the present embodiment, the removable disk drive 10 is provided with a housing 4 covering the outside thereof. The housing 4 is fixed to the whole system (not shown) to be a frame ground and an electric reference for the whole removable disk drive 10. The recording disk 6 is a housing with a recording medium (not shown) housed therein for recording data on the recording medium. The removable disk drive 10 is provided with an insertion slot 9 for inserting the recording disk 6. Therefore, the recording disk 6 is attached to and detached from the removable disk drive 10 through the insertion slot 9.

Further, a platform 2 is provided in the housing 4. A spindle motor 3 is mounted on the platform 2, and a spindle motor shaft 1 is provided at the center of rotation of the spindle motor 3. The platform 2 is for supporting and fixing the spindle motor 3, and can be moved in a vertical direction within the housing 4. The spindle motor 3 is for rotating the spindle motor shaft 1. The spindle motor shaft 1 is supported by a bearing 13 provided in the spindle motor 3, and is held to stand vertically with respect to the spindle motor 3. The spindle motor shaft 1 engages with a hub 8 of the recording disk 6 to locate the recording disk 6, and rotates through the hub 8 the recording medium in the recording disk 6. When the platform 2 is in a lower position, that is, in a position where the distance between the platform 2 and the housing 4 is smaller on the side of the platform 2 where the electrostatic brush 5 is disposed, though the spindle motor shaft 1 is in contact with the shutter 7 or the hub 8, it does not engage with the hub 8. On the other hand, when the platform 2 is in a higher position, that is, in a position where the above distance is larger, the spindle motor shaft 1 engages with the hub 8.

Further, the removable disk drive 10 is provided with an electrostatic brush 5 for short-circuiting the spindle motor shaft 1 and the housing 4 to discharge to the housing 4 static electricity with which the recording disk 6 is charged. One end of the electrostatic brush 5 is fixed to a surface of the platform 2 opposite to its surface where the spindle motor 3 is mounted, and the electrostatic brush 5 is disposed between the spindle motor shaft 1 and the housing 4. The electrostatic brush 5 is formed of a resilient conductive material, and is pressed according to the operation of the platform 2. When the platform 2 is in the above-mentioned lower position, the electrostatic brush 5 is in contact with the spindle motor shaft 1 and the housing 4, and is pressed between them. On the other hand, when the platform 2 is in the above-mentioned higher position, the electrostatic brush 5 is out of contact with the spindle motor shaft 1 and the housing 4, and thus, is not pressed.

Next, the operation of the removable disk drive 10 when the recording disk 6 with the shutter 7 and the hub 8 charged with static electricity is inserted in the removable disk drive 10 is described. As illustrated in FIG. 1, when the operation of inserting the recording disk 6 in the removable disk drive 10 is on the way, the platform 2 is disposed in the above-mentioned lower position such that the recording disk 6 is not caught on the spindle motor shaft 1. Here, the electrostatic brush 5 is pressed by the spindle motor shaft 1 and the housing 4, and is in contact with them with predetermined pressing force. It is to be noted that, when the recording disk 6 is not inserted in the removable disk drive 10 at all, the platform 2 is also disposed in the above-mentioned lower position, and the electrostatic brush 5 is in contact with the spindle motor shaft 1 and the housing 4.

When the recording disk 6 is inserted in the removable disk drive 10 through the insertion slot 9, first, the shutter 7 of the recording disk 6 comes in contact with the spindle motor shaft 1, the shutter 7 and the housing 4 are short-circuited through the spindle motor shaft 1 and the electrostatic brush 5, and the static electricity with which the shutter 7 is charged is discharged to the housing 4 to be removed through the spindle motor shaft 1 and the electrostatic brush 5. Then, the hub 8 comes in contact with the spindle motor shaft 1, the hub 8 and the housing 4 are short-circuited through the spindle motor shaft 1 and the electrostatic brush 5, and the static electricity with which the hub 8 is charged is discharged to the housing 4 to be removed through the spindle motor shaft 1 and the electrostatic brush 5.

Then, as illustrated in FIG. 2, when the recording disk 6 is completely inserted in the removable disk drive 10, the platform 2 moves to the above-mentioned higher position, the spindle motor shaft 1 engages with the hub 8 of the recording disk 6, and the recording disk 6 is located. Here, the electrostatic brush 5 is out of contact with either of the spindle motor shaft 1 and the housing 4, and is not pressed.

After that, with this state maintained, the spindle motor shaft 1 is rotated to carry out operation of reading data from or writing data to the recording disk 6.

In the present embodiment, as illustrated in FIG. 1, when the operation of inserting the recording disk 6 in the removable disk drive 10 is on the way, the electrostatic brush 5 is in contact with the spindle motor shaft 1 and the housing 4, and thus, static electricity with which the recording disk 6 is charged can be removed by being discharged to the housing 4.

Further, when the recording disk 6 is completely inserted in the removable disk drive 10 as illustrated in FIG. 2, the electrostatic brush 5 is out of contact with the spindle motor shaft 1. The spindle motor shaft 1 is rotated in order to carry out the operation of writing to and reading from the recording disk 6. Since the electrostatic brush 5 is out of contact, noise is not produced by rubbing the electrostatic brush 5 with the spindle motor shaft 1. Further, metal powder is not produced by wear. Still further, since the electrostatic brush 5 is not a load on the rotation of the spindle motor shaft 1, increase in the electric power consumption and in the amount of generated heat can be prevented.

It is to be noted that, though, in the present embodiment, an example where the electrostatic brush 5 is attached to the platform 2 is described, the shape, the arrangement and the like of the electrostatic brush according to the present invention is not limited thereto, and the shape and the arrangement may be arbitrary. For example, the electrostatic brush 5 may have a spring-like structure which is held upright from the housing 4 adjacent the spindle motor shaft 1.

As described in detail in the above, according to the present invention, static electricity with which a recording disk is charged can be removed, noise and metal powder do not accompany the rotation of a spindle motor shaft, and the electric power consumption and the amount of generated heat of a removable disk drive can be decreased.

While this invention has been described in conjunction with the preferred embodiment described above, it will now be possible for those skilled in the art to put this invention into practice in various other manners.

What is claimed is:

1. A removable disk drive having a recording disk inserted therein for reading data from and writing data to said recording disk, comprising:

a housing;

a spindle motor shaft provided in said housing for rotating said recording disk; and an electrostatic brush provided between said housing and said spindle motor shaft, said electrostatic brush coming in contact with said housing and said spindle motor shaft and being formed of a conductive material for discharging static electricity of said recording disk to said housing, wherein said electrostatic brush is in contact with said spindle motor shaft and said housing when operation of inserting said recording disk is on the way and is out of contact with said spindle motor shaft when said spindle motor shaft is rotating after insertion of said recording disk is completed.

2. A removable disk drive as claimed in claim 1, wherein said electrostatic brush is formed of a resilient material and comes in contact with said spindle motor shaft with predetermined pressing force.

3. A removable disk drive as claimed in claim 1, wherein said electrostatic brush has a spring structure and comes in contact with said spindle motor shaft with predetermined pressing force.

4. A removable disk drive as claimed in claim 1 further comprising a platform for supporting said spindle motor shaft, characterized in that one end of said electrostatic brush is fixed to said platform.

* * * * *